Figure 1:
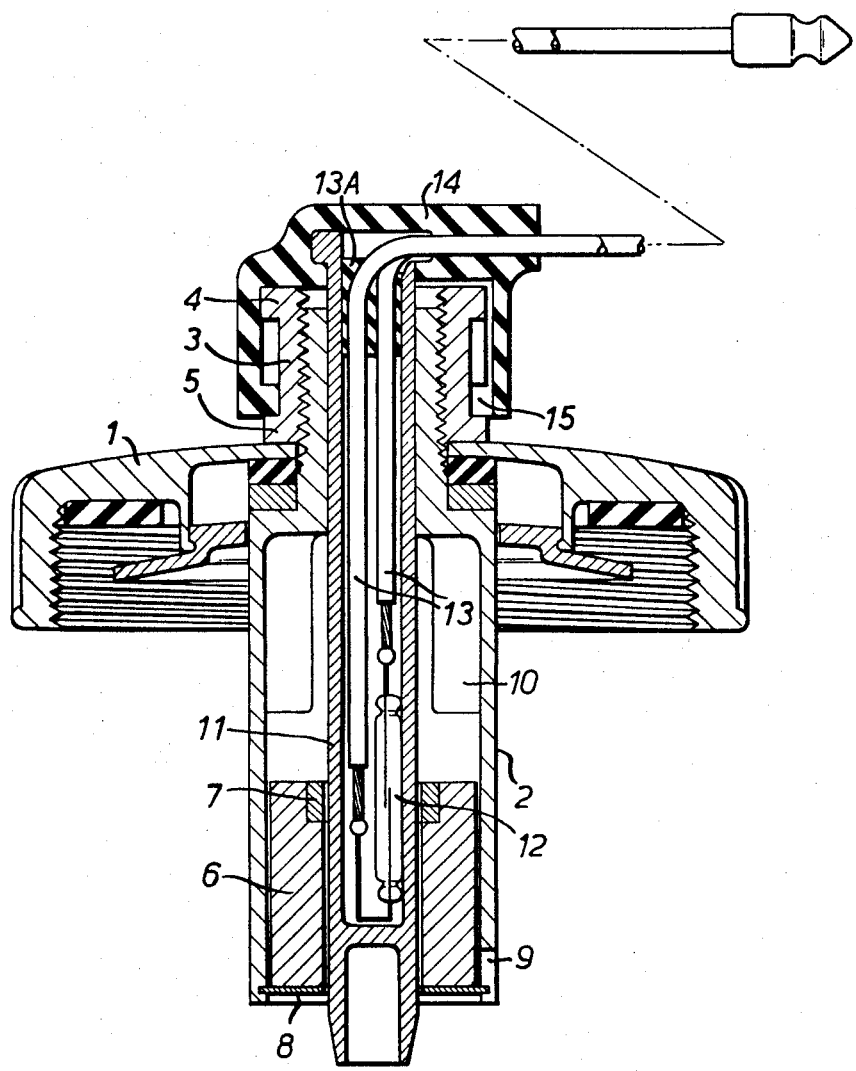

United States Patent [19]
Jones

[11] 3,751,614
[45] Aug. 7, 1973

[54] FLUID LEVEL INDICATING DEVICES WITH PULL TO TEST FEATURE
[75] Inventor: Peter Jones, Birmingham, England
[73] Assignee: Girling Limited, Birmingham, England
[22] Filed: May 24, 1972
[21] Appl. No.: 256,301

[30] Foreign Application Priority Data
May 26, 1971 Great Britain.................. 17,234/71
Feb. 15, 1972 Great Britain..................... 6,951/72
Mar. 6, 1972 Great Britain................... 10,425/72

[52] U.S. Cl............. 200/84 C, 200/81 H, 340/214
[51] Int. Cl. ........................................... H01h 36/02
[58] Field of Search .................. 200/84 C, 81.9 M, 200/82 E, 83 Z, 81 H, 168 G, 84 R; 340/214 411

[56] References Cited
UNITED STATES PATENTS
3,363,073  1/1968  Bouget.......................... 200/81.9 M
3,488,464  1/1970  Hocking..................... 200/81 H UX
3,623,051  11/1971 Juno et al. ...................... 340/214 X
3.654,956  4/1972  Tsubouchi.................. 200/84 C UX
3,680,044  7/1972  Tsubouchi..................... 200/84 C X FOREIGN PATENTS OR APPLICATIONS
1,190,688  4/1965  Germany........................... 200/84 C Primary Examiner—Herman J. Hohauser
Assistant Examiner—Robert A. Vanderhyde
Attorney—Samuel Scrivener, Jr., John H. O. Clarke et al.

[57] ABSTRACT

A fluid indicating switch is provided with a test feature. A closure cap assembly having magnetically actuated switch means and a magnetic fluid level responsive means is attached to a fluid reservoir. The fluid level responsive magnetic means will actuate the switch in response to changes in the reservoir fluid level or by manual pull upon the cap assembly.

10 Claims, 6 Drawing Figures

FLUID LEVEL INDICATING DEVICES WITH PULL TO TEST FEATURE

This invention relates to fluid level indicating devices of the general form in which a level responsive member, such as a float, is arranged to actuate a signal initiating means, such as an electric switch, when a predetermined liquid level is sensed by the float.

Such devices are, for example, employed in the reservoir of hydraulic systems, such as hydraulic brake systems of motor vehicles.

There is a growing requirement for such devices to be constructed in a manner which allows testing at will of the device, and the present invention is concerned with the provision of such a device having this test facility.

The invention provides a fluid level indicating device comprising a main housing, a level responsive member, a housing member contained, at least in part, within the main housing, magnetic means mounted on one of the said members, and magnetically operable switch means mounted on the other of the said members, the switch means being actuated by movement of the magnetic means relative thereto, the arrangement being such that relative movement of the switch means and the magnetic means can be effected by movement of the level responsive member automatically in response to changes in liquid level, and alternatively by manual movement of the level responsive member and the housing member relative to each other to test the device.

Preferably, the switch is a reed switch mounted in the housing member, and the magnetic means is a permanent magnet mounted on the level responsive member, which may be a float, movable in use relative to the housing member. Testing is effected by manual displacement of the housing or, in an alternative embodiment, by manual displacement of the float.

When the indicating devices in accordance with the invention are employed in, for example, fluid reservoirs of hydraulic brake systems of motor vehicles, they are advantageously mounted on cap assemblies for the reservoirs.

During braking, the level of fluid in a brake fluid reservoir falls and rises, and brake wear causes a long term reduction in the fluid level. Such variations in fluid level must be accompanied by a flow of air into or out of the reservoir space above the fluid to prevent the formation of a vacuum or pressure within the reservoir. The air drawn into the reservoir space from outside the cap assembly when the fluid level falls is usually contaminated, for example by water vapour, with resulting contamination of the brake fluid.

In accordance with another feature of the invention the device is mounted on a closure cap assembly for a fluid reservoir, said cap assembly comprising an extended passage means extending, in use, between the outside of the closure cap and reservoir space above the fluid in the reservoir.

The extended passage means constitutes an air reservoir within the cap assembly which can at least partially satisfy the requirement for additional air to replace liquid in the reservoir when the liquid level falls.

Figure 2:
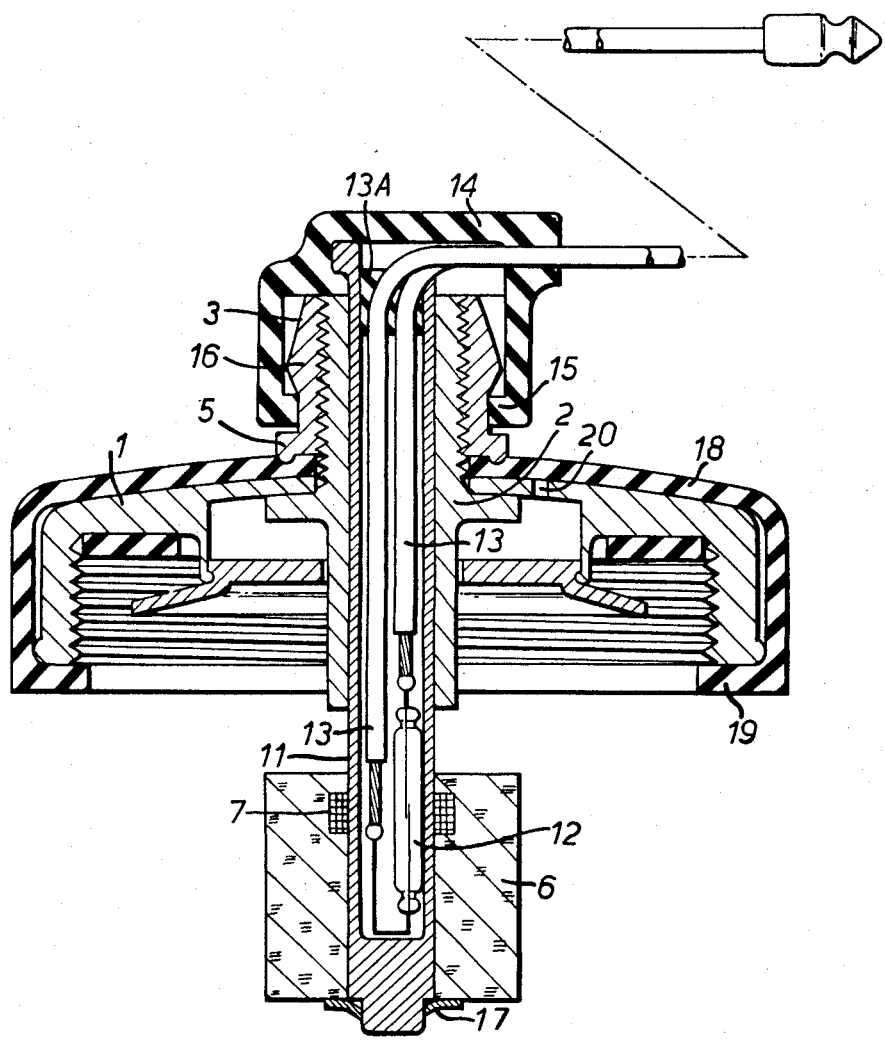
Figure 3:
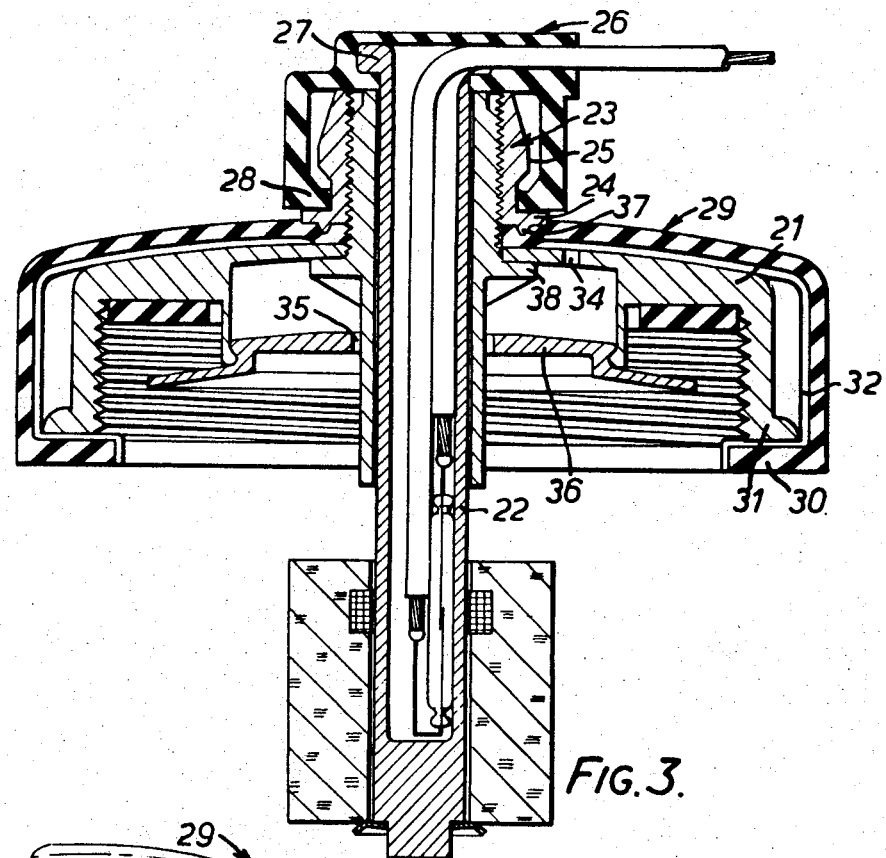
Figure 4:
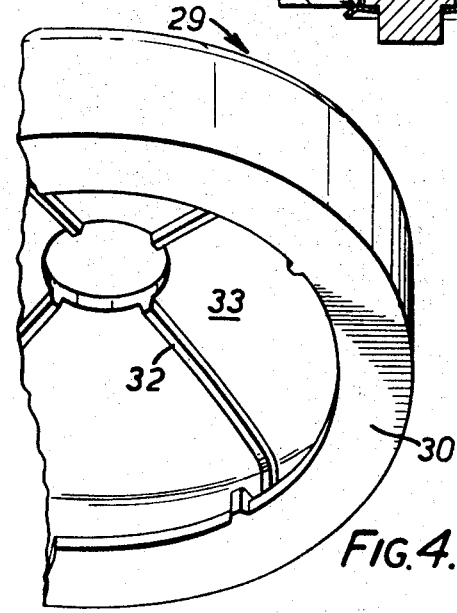
Figure 5:
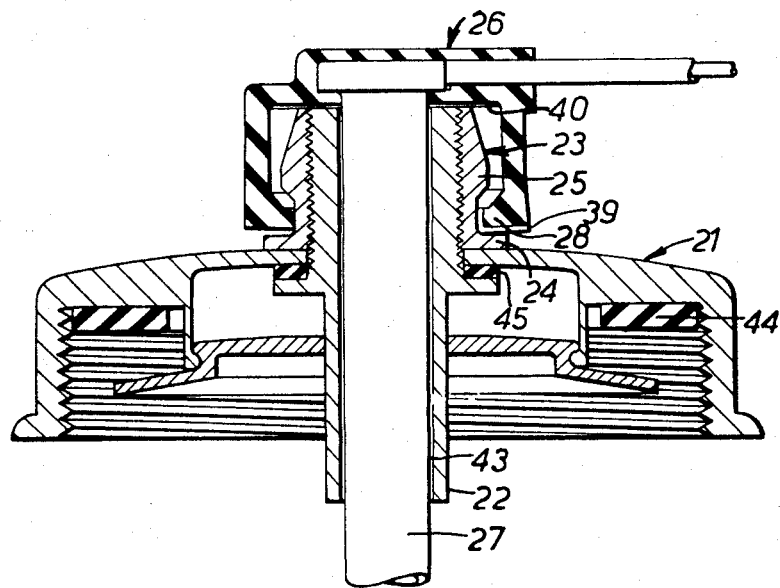
Figure 6:
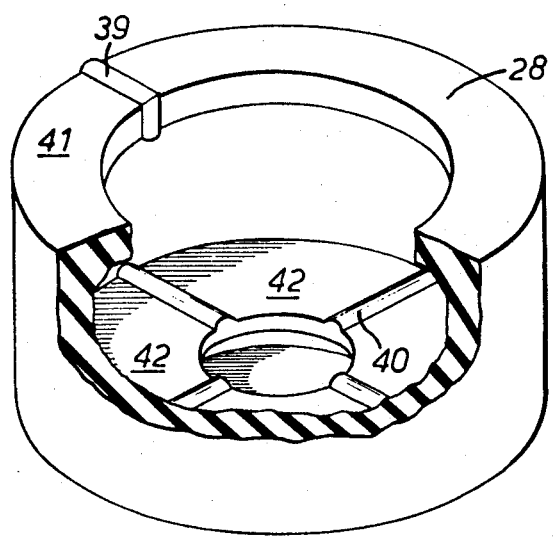

Some forms of fluid level indicating devices in accordance with the invention will now be described, by way of example, with reference to the accompanying drawings, in which:

FIG. 1 is an axial cross-section of one form of device mounted on a fluid reservoir closure cap assembly, FIG. 2 is an axial cross-section of another form of device mounted on another fluid reservoir closure cap assembly, FIG. 3 is an axial cross-section of another fluid reservoir closure cap assembly carrying the fluid level indicating device of FIG. 2, FIG. 4 is a perspective view from beneath of a dust cover forming part of the cap assembly of FIG. 3, FIG. 5 is an axial cross-section of yet another form of closure cap assembly carrying a fluid level indicating device, and FIG. 6 is a perspective view from beneath of a top cap part of the assembly of FIG. 5.

The indicating devices illustrated in FIGS. 1 and 2 are each mounted on a cap assembly for an hydraylic brake fluid reservoir, the cap assembly having a main cap part 1. Each device comprises a main, hollow housing 2 extending through the cap part 1 and secured in position with the aid of a retaining member in the form of a screw threaded nipple 3.

In the device shown in FIG. 1, the nipple 3 has outwardly projecting radial flanges 4 and 5 at its upper and lower ends. The lower end of the main housing 2 contains an annular float 6 carrying an annular permanent magnet 7 supported in its lower most position, as illustrated, by a split ring washer 8. A hole 9 in the side wall of the housing allows the entry and discharge of hydraulic fluid in use of the device and upward movement of the float in use is limited by axial vanes 10 provided in the main housing 2.

Extending axially and slidably through the main housing is switch housing member 11, closed at its lower end and housing a reed-switch 12 from which insulated conductors 13 are taken through a sealing grommet 13A at the top of the switch housing. A snap-fit rubber cap member 14 encloses the upper end of the switch housing and has an internal flange 15 for engagement in the recess between the flanges 4 and 5 of the nipple 3, so that the latter flanges act as stops to limit axial movement of the cap member 14 and switch housing relative to the main housing.

The reed-switch 12 is actuated by the magnet in the illustrated position of the parts, which corresponds to the low level warning position of the device, when the reservoir in which the device is used is filled above the predetermined low level, the float is raised and the reed-switch is in an "open" condition. When the liquid level drops to the low-level, and the float moves to its illustrated position, the moving magnetic field generated by the permanent magnet 7, closes the switch to initiate a warning signal, e.g. by energising a warning lamp or audible warning device.

To test the device and external circuitry while the reservoir is full, the cap member 14 is gripped by the user and the cap member, together with the switch housing member 11, is raised to move the switch to a position relative to the magnet in which the switch should close. When the circuits have been proved, the switch housing member is pushed back to its illustrated position.

The construction of the indicating device of FIG. 2 is generally similar to that illustrated in FIG. 1 and only the main differences will now be described. Corresponding parts of the devices have been allotted the same reference numerals.

In the arrangement shown in FIG. 2, the nipple 3 has a projection 16 intermediate its ends instead of the upper flange 4. The projecton 16 has ramp-like upper and lower surfaces on which the flange 15 of snap-fit cap member 14 can ride to facilitate movements of the cap into and out of its illustrated, "engaged" position.

The float 6 is supported below the housing 2 on the switch housing 11, its downward movement relative thereto being limited by a spragged clip 17 engaged over the lower closed end of switch housing 11.

In this embodiment a seal around the main housing 2 is provided by the inner periphery of the upper end of a dust cover 18 which fits over the cap part 1. The lower end of the dust cover has an inwardly directed radial flange 19 which engages under the inner peripheral edge of the cap part 1 to exclude dirt and moisture when the cap is fitted to the reservoir body.

In order to vent the reservoir, to compensate for changes in the volume of liquid contained therein, a vent hole 20 is provided in the cap part 1, there being sufficient clearance between the cap part 1 and dust cover 18 for an adequate air flow.

Operation of this device is generally similar to that of the device of FIG. 1 except that axial movement of the switch is limited by the abutment of float 6 with the clip 17, and the lower end of the main housing 2, respectively.

An advantage of this embodiment is that the height of the snap-fit cap assembly above the closure member and the diameter of the device can be relatively small.

The cap assemblies illustrated in FIGS. 3 to 6 are intended for vehicle hydraulic brake fluid reservoirs and are arranged to carry fluid level indicating devices of the form described with reference to FIGS. 1 and 2.

Each of the cap assemblies comprises a main cap part 21 for screw-threaded engagement with the reservoir housing; and a main hollow housing 22 extending through the main cap part and secured in position by means of a screw-threaded nipple 23 having outwardly projecting flanges 24,25. A top cap member 26 supports an inner housing member 27 for the fluid level indicating device and has a radially inwardly directed flange 28 for co-operation with the nipple 23 between its flanges 24,25.

Referring now to FIGS. 3 and 4 a dust cover 29 shrouds the main cap part 21 and has a radially inwardly directed flange 30 which fits over the lower annular edge 31 of cap part 21. The dust cover has a number of protuberances 32, four in the embodiment shown, which extend along the inner surface of the cover from the inner edge of the flange 30. The spaces 33 between the protuberances communicate with the reservoir through corresponding apertures 34 in the main cap part 21 and an annular passageway 35 in a disc like member 36 supported by the cap 21. As an alternative, the dust cover 29 may be provided with grooves instead of protuberances. The inner periphery of the dust cover is sealed by its sealing engagement with an annular projection 37 of the flange 24 of nipple 23 and the inner periphery of main cap part 21 which is supported by a flange portion 38 of the main housing 22.

Turning to FIGS. 5 and 6, the top cap member 26 has radially directed protuberances 39,40 on the bottom and inner surface of its flange 28 and along the bottom surface of its top end respectively. The spaces 41 between the protuberances 39 communicate via the spaces 42 between protuberances 40 and an annular passageway 43 between the main housing 22 and inner housing member 27 with the reservoir. The passage of air between the main cap part 21 and the reservoir housing is prevented by a seal 44 which is in use engaged by the reservoir housing. A seal 45 is provided between the cap part 21 and the outer housing 22. Of course, the top cap member 26 may be provided with grooves or other means allowing the passage of air.

Both of the described cap assemblies provide extended passage means in the form of spaces and passages 33,34,35 and 41,42,43 which allow air to flow from outside the assemblies to the reservoir. The passage means effectively provides air reservoir means within the assemblies. Thus, small drops in the fluid level in the fluid reservoir cause air from the extended passage means to be drawn into the fluid reservoir without air being drawn into the reservoir from outside the cap assemblies.

Many variations and modifications will, of course, be possible within the scope of the present invention. For example; the device may be arranged to operate in response to a high level rather than a low level; the switch housing may be fixed relative to the main housing and testing effected by manual movement of the float; the permanent magnet may be replaced by an electromagnet energised, for example when the vehicle ignition system is switched on; the device need not be mounted in use in a reservoir cap, but could be inserted, for example, through the wall of a reservoir.

I claim:

1. In or for a closure cap assembly having a main cap part for attachment to a fluid reservoir, a fluid level indicating device comprising a main housing, a level responsive member, a housing member contained, at least in part, within the main housing, magnetic means mounted on one of said members, and magnetically operable switch means mounted on the other of said members, the switch means being operable in response to movement of the magnetic means relative thereto, means for effecting automatic movement of said magnetic means relative to said switch means by movement of the level responsive member in response to changes in the reservoir fluid level, and alternative means for effecting the relative movement between said magnetic means and said switch means by relative manual movement between the level responsive member and the housing member to test the device.

2. A device according to claim 1, wherein the switch means is mounted on the housing member and the magnetic means is mounted on the level responsive member, which surrounds the housing member.

3. A device according to claim 1, wherein the said relative movement between the level responsive member and the housing member is in response to manual relative axial movement between the housing member and the main housing.

4. A device according to claim 1, wherein the main housing extends through the main cap part and is secured thereto, and further comprising a manually grippable cap means fast with the housing member, which cap means encloses one end of the main housing and is movable relative thereto to cause relative movement between the housing member and the level responsive member, to test the device.

5. A device according to claim 4, including means for limiting relative movement between the housing member and the main housing, said means comprising a retaining member surrounding the said one end of the main housing and securing the main housing to the main cap part, and stop means formed on the retaining member for engagement by the cap means.

6. A device according to claim 4, including means for limiting relative movement between the housing member and the main housing, said means comprising a radially outwardly extending stop means carried by the housing member at one end thereof remote from the cap means, and arranged to abut the level responsive member.

7. A device according to claim 1, wherein the closure cap assembly comprises an extended passage means extending, in use, between the outside of the main cap part and a reservoir space above the fluid in the reservoir.

8. A device according to claim 7, wherein the cap assembly comprises a cover enclosing the main cap part, and the extended passage means comprises at least one passageway formed between the main cap part and the cover and a vent hole presented by the main cap part and communicating with the or each passageway.

9. A device according to claim 8, further comprising a radially extending shoulder fast with the main housing, a radially extending flange carried by the main housing, and an axially extending projecting means formed on said flange, wherein the main cap part and the cover are clamped between the shoulder and the flange and the projecting means engages the cover to ensure sealing engagement between the cover and the main cap part in the vicinity of the projecting means.

10. A device according to claim 7, wherein the extended passage means comprises at least one passageway between the cap means and the main housing and at least one communicating passageway between the housing member and the main housing.

* * * * *